US006869495B2

(12) United States Patent
Snooks

(10) Patent No.: US 6,869,495 B2
(45) Date of Patent: Mar. 22, 2005

(54) ARTICLE ATTACHMENT DEVICE AND METHOD

(75) Inventor: Charles A. Snooks, 56312 Summit Dr., Shelby Township, MI (US) 48316

(73) Assignee: Charles A. Snooks, Shelby Township, MI (US)

( * ) Notice: Subject to any disclaimer, the term of this patent is extended or adjusted under 35 U.S.C. 154(b) by 136 days.

(21) Appl. No.: 10/256,620

(22) Filed: Sep. 27, 2002

(65) Prior Publication Data

US 2004/0061254 A1 Apr. 1, 2004

(51) Int. Cl.[7] .......................... B32B 31/06; B29C 45/14

(52) U.S. Cl. ............................ 156/244.11; 156/244.15; 156/293; 156/305; 264/275

(58) Field of Search ................................ 264/159, 250, 264/275; 156/244.11, 244.15, 293, 305; 160/398, 404

(56) References Cited

U.S. PATENT DOCUMENTS

| | | | | |
|---|---|---|---|---|
| 2,368,053 A | | 1/1945 | Voorhees | |
| 3,175,269 A | | 3/1965 | Wilber et al. | |
| 3,281,185 A | | 10/1966 | Albinson et al. | |
| 3,489,085 A | * | 1/1970 | Kirkpatrick | 101/415.1 |
| 3,925,861 A | * | 12/1975 | Tillner | 24/1 |
| 4,741,789 A | | 5/1988 | Zieke et al. | |
| 5,013,089 A | | 5/1991 | Aub-Isa et al. | |
| 5,382,083 A | | 1/1995 | Fecteau et al. | |
| 5,658,046 A | | 8/1997 | Rus | |
| 5,820,212 A | | 10/1998 | Hoshino et al. | |
| 5,820,213 A | | 10/1998 | Severinski | |
| 5,826,939 A | | 10/1998 | Beyer | |
| 5,873,318 A | | 2/1999 | Bohlinger et al. | |
| 5,971,478 A | | 10/1999 | Hurite | |
| 6,234,558 B1 | | 5/2001 | Curtindale | |
| 6,238,157 B1 | | 5/2001 | Davis, Jr. et al. | |
| 6,322,141 B1 | | 11/2001 | Dutkievic et al. | |
| 6,322,148 B1 | | 11/2001 | Kolena et al. | |
| 6,406,093 B1 | | 6/2002 | Miotto et al. | |

FOREIGN PATENT DOCUMENTS

| | | |
|---|---|---|
| DE | 1 468 414 | 3/1977 |
| DE | 42 19 891 | 12/1993 |
| DE | 197 34 408 | 2/1999 |
| DE | 100 54 073 | 5/2002 |
| EP | 0 403 815 B1 | 1/1994 |
| EP | 0 925 745 | 6/1999 |
| FR | 2 735 960 | 6/1995 |
| WO | WO 2004/014690 | 2/2004 |

OTHER PUBLICATIONS

Excerpts from www.oke–online.de/en/top/htm (4 pages) dated Jan. 23, 2003.

* cited by examiner

*Primary Examiner*—Melvin C. Mayes

(57) ABSTRACT

A method for attaching a substrate to a plastic profile, in which a profile is extruded from a plastic material. The profile has at least two separable legs that define a channel for receiving a substrate. A substrate is placed in the channel and a liquid material is injected, which upon hardening will join the substrate with the profile.

22 Claims, 13 Drawing Sheets

ARTICLE ATTACHMENT DEVICE AND METHOD

TECHNICAL FIELD

The present invention relates to article attachment devices and more specifically extruded devices adapted for attaching a seat cover to an underlying structure for forming a vehicle seat.

BACKGROUND

The use of J-hook attachments for securing seat covers to an underlying seat structure is well known. In a typical seating system, for example, an upholstery material is provided with a J-hook attachment along its edge. The upholstery material ordinarily will be secured to the J-hook attachment by stitching the J-hook attachment to the upholstery material along the length of the edge. The J-hook is then coupled with the upholstery material so that the material can be secured in place, such as to a seat frame, by way of the J-hook. There is a desire to improve the efficiency of this process while maintaining the integrity achievable using a stitching process.

It is believed that at least one attempt has been made to secure a polypropylene fabric to an extruded profile of polypropylene by providing an extrude circular profile having a wedge omitted. The walls defining the wedge are believed to be coated with a bonding material and pressure is applied to marry the profile at the walls to the fabric. The resulting product has the appearance of a fabric with an extruded plastic bead along its edge.

Direct extrusion of a profile along an edge of an upholstery material is generally difficult, particularly with any substantial profile section thicknesses. That is, upon cooling, the extruded profile tends to exhibit thermal distortion, resulting in an uncontrolled irregular, wavy surface.

As can be seen, there is thus a need for an improved approach for marrying substrates to an extruded profile.

SUMMARY OF THE INVENTION

The present invention meets the above needs by providing a method for attaching a substrate to a plastic profile, comprising the steps of:

a. extruding a profile from a plastic material that has at least two separable legs that define a channel for receiving a substrate;

b. placing the substrate in the channel; and c. introducing a liquid material into the channel with the substrate for joining the substrate with the profile.

The present invention also contemplates articles prepared by the above method.

In a particularly preferred aspect the present invention also contemplates a seat cover for an automotive vehicle in which an extruded polypropylene profile including a hook is secured to a polypropylene fabric with a bead of molten polypropylene. Upon solidification of the molten polypropylene, the profile is substantially free of thermal distortion and a step of stitching the profile to the fabric can be avoided.

DETAILED DESCRIPTION OF THE INVENTION

Figure 1:
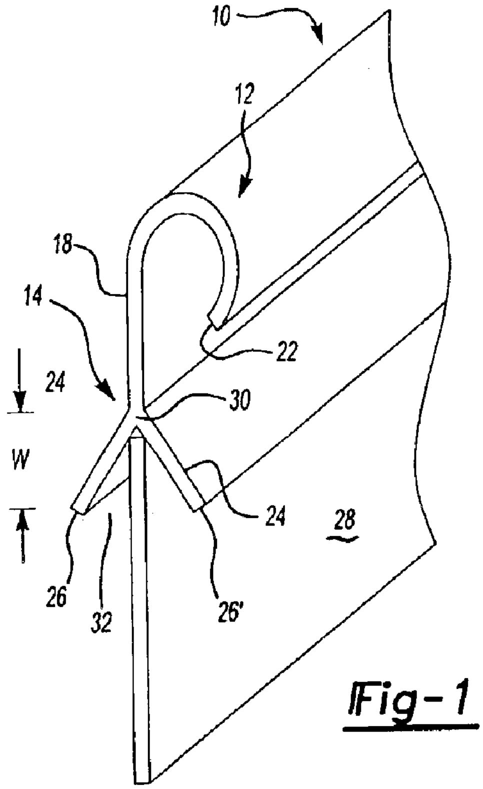
FIG. 1 is a perspective view illustrating an example of an extruded J-hook profile of the present invention before securing to a substrate.
Figure 2:
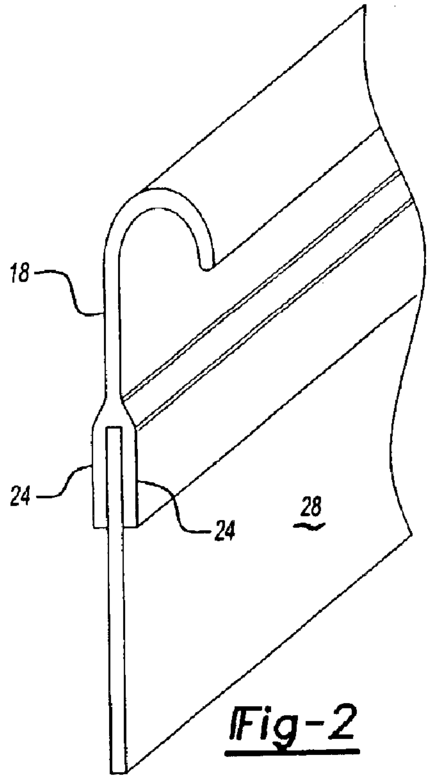
FIG. 2 illustrates the profile of FIG. 1 secured to a substrate.

The present invention is predicated upon the discovery of an improved approach to securing an extruded plastic profile to a substrate, and particularly to an upholstery material. Referring to FIGS. 1 and 2, there is shown an example of one extruded profile 10, in accordance with the present invention, in which the profile 10 includes a first portion 12 for attaching to a structure and a second portion 14 for securing the profile to an upholstery material 16. Optionally there is an intermediate portion comprising a web 18 that bridges the first portion 12 and the second portion 14. The first portion includes an arcuate hook section terminating at a tip 22. Preferably, the hook is a J-hook configuration.

Figure 3:
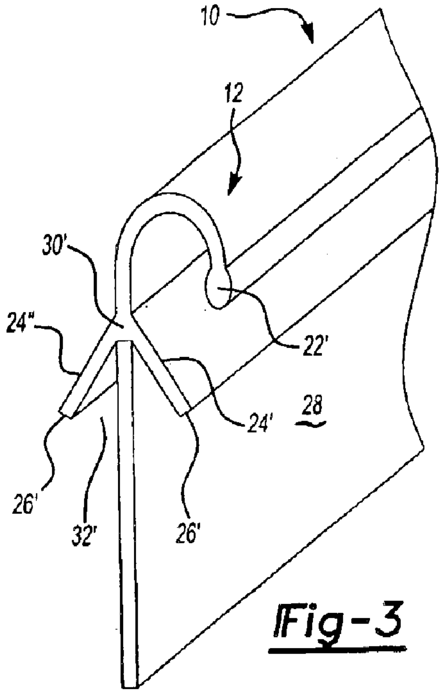
FIG. 3 is a perspective view illustrating another example of an extruded J-hook profile of the present invention before securing to a substrate.
Figure 4:
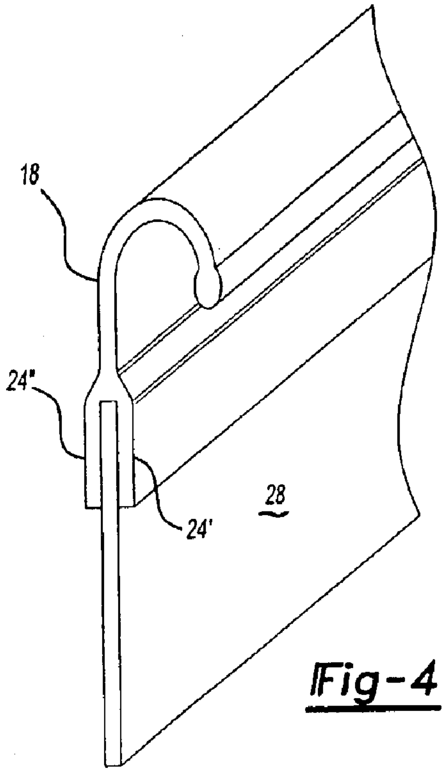
FIG. 4 illustrates the profile of FIG. 3 secured to a substrate.

The width (W) of the web may be any suitable amount and may range up to about 15 cm or larger. More typically it is less than about 10 cm and still more preferably less than about 3 cm, or even less than about 1 cm. In the embodiment of FIGS. 3 and 4 (where like parts are denoted by like reference numerals, accompanied by a prime (') notation), the width is approximately zero. Thus, the tip 22 is substantially juxtaposed with the second portion 14. It will be appreciated that such a structure offers an advantage over typical conventional J-hook attachments that require stitching. That is, though stitching may be performed using the present invention, it is more preferably omitted. Thus, the clearance space needed for a needle access the web portion of a typical J-hook has required a fairly large width for the web, thereby adding to a material and processing costs. The avoidance of such a structure herein thus enables less material to be used for the profile, or a reallocation of the material to other locations for providing added strength, function or a combination thereof.

Another distinguishing feature over previous J-hook profiles is the inclusion of opposing legs 24 (24') in the second portion 14. As extruded, the legs each preferably have a distal end 26 that are spaced from each other, but which preferably are brought into generally opposing relation to each other with an upholstery material 28 (28'), as shown in FIGS. 2 and 4, for securing the upholstery material therebetween. The juxtaposition of the tip 22 with the legs 24(24') can be seen. More particularly the juxtaposition of the tip is generally proximate an apex 30 (30').

Referring again to FIGS. 1 and 3, other configurations are possible, such as where the legs are initially generally parallel to each other (i.e., upon extrusion). However, it is particularly preferred during attachment of a substrate that the legs are spread relative to each other, and even more preferred, the legs join at the apex 30 (30'), for defining channel 32 (32') for receiving the substrate (e.g., upholstery material).

Figure 5:
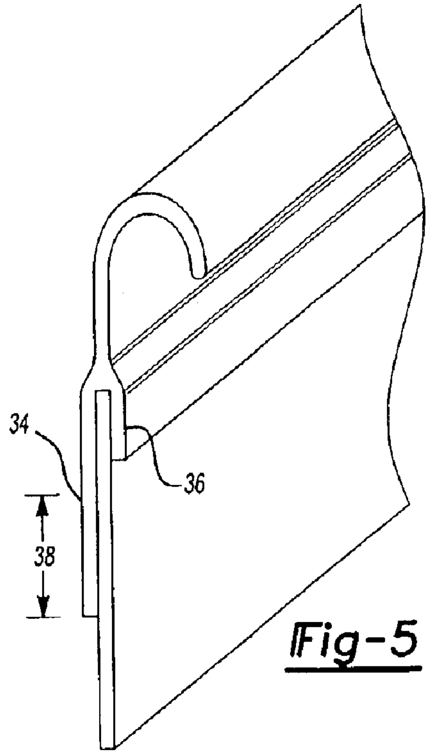
FIG. 5 is an example of a profile having opposing legs each of substantially different dimensions.

The legs need not be of the same length, shape or other dimension, but may vary relative to each other or at locations continuously or intermittently along their length. For example, as seen in FIG. 5, one leg 34 may be longer than another leg 36, and this provides an extended surface 38 that could provide, for example, a visible decorative surface, or a surface for carrying another decorative surface, such as an insert, a co-extrusion or the like of a layer of upholstery material, foil, wood veneer, or otherwise. The present invention thus also contemplates methods and articles in which the extended surface carries an additional layer.

Figure 6:
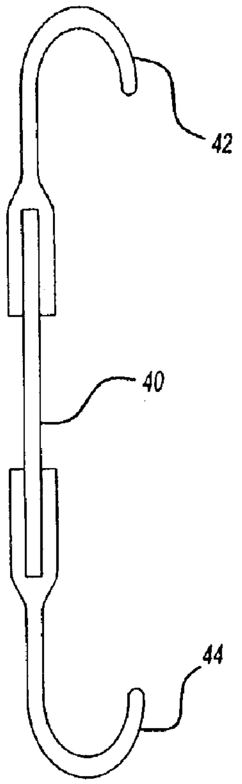
FIG. 6 shows an alternative embodiment of the present invention in which a substrate has an extruded attachment mechanism on opposing ends.

FIG. 6 illustrates a substrate (e.g., a fabric) 40 that has a pair of alternative illustrative profiles 42 and 44 on opposing edges of the fabric 40. In this manner, the fabric may be folded upon itself and the pair of profiles joined together, such as by hooking, snapping, zipping, or the like. Each of the profiles 42 and 44 may be designed to complement each other for achieving the attachment. The particular shape of the profile is not critical, and any of the profiles described herein, among others, may be substituted for the profiles shown in FIG. 6.

Figure 7:
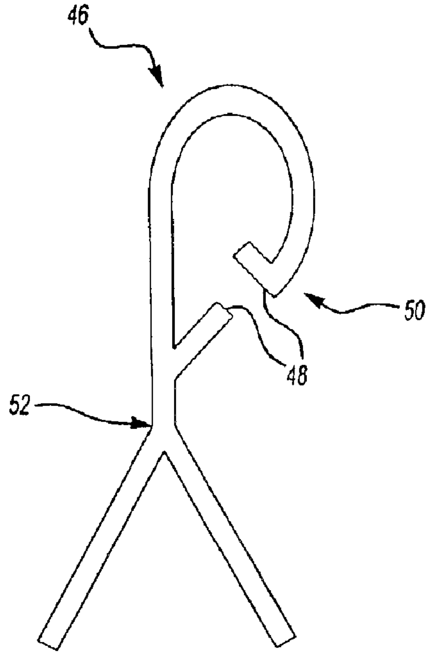
FIG. 7 is a front view illustrating another highly preferred profile in accordance with the present invention.

FIG. 7 illustrates another highly preferred profile 46 in which one or a plurality of grippers 48 are included on a tip portion 50, adjacent an apex portion 52, or a combination thereof.

Referring to FIGS. 8A–8O, 9A–9X, 10A–10R, and 11A–11R, there are shown, without limitation, examples of a variety of alternative profile configurations that can be employed in place of or in addition to the first portion of the profiles of FIGS. 1–7. In each instance, the second portion (namely second portion 14 of FIGS. 1–7) has been omitted from the drawings, it being recognized that the second portion of the profiles of FIGS. 8A–8O, 9A–9X, 10A–10R, and 11A–11R would necessarily include a second portion, consistent with the structure of the second portion 14 that has been disclosed. Specifically, the structures illustrated are intended also to include a second portion with structures that have free ends that can be spaced from each other for forming a channel, into which the substrate (e.g., upholstery material) and liquid can be placed.

Figure 8A:
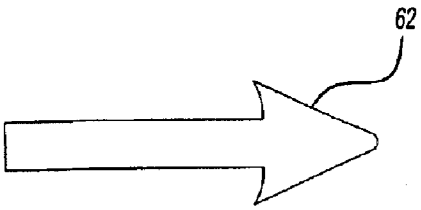
FIGS. 8A–8O are front views illustrating a variety of different profiles useful in accordance with the present invention.
Figure 8B:
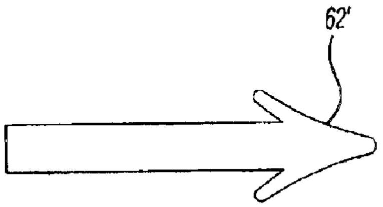
Figure 8C:
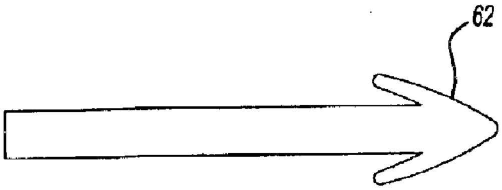
Figure 8D:
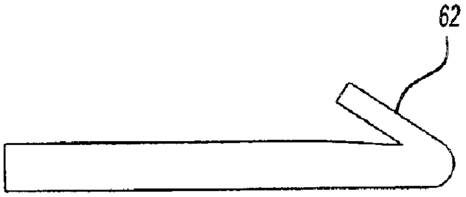
Figure 8E:
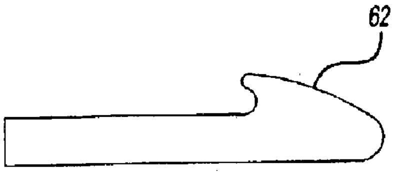
Figure 8F:
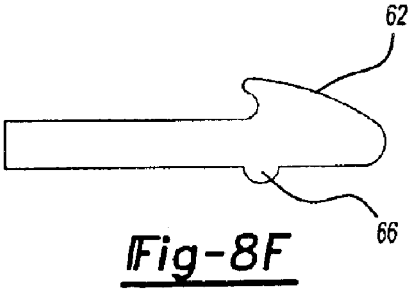
Figure 8G:
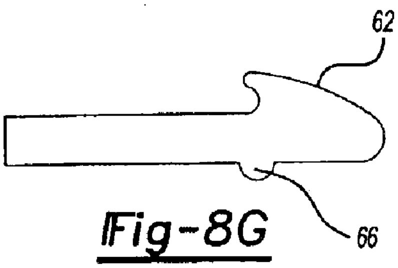
Figure 8H:
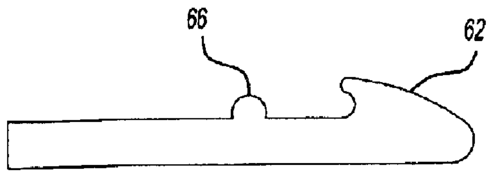
Figure 8I:
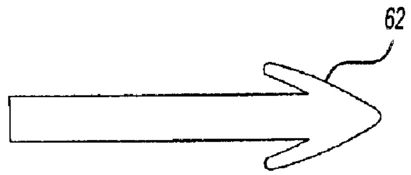
Figure 8J:
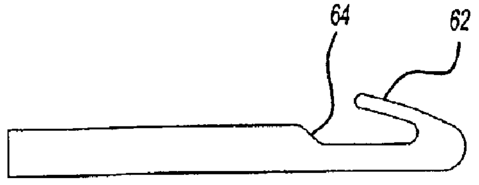
Figure 8K:
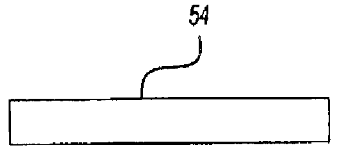
Figure 8L:
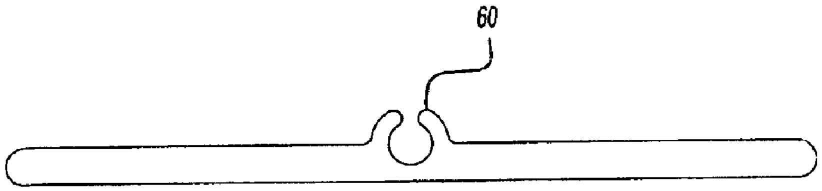
Figure 8M:
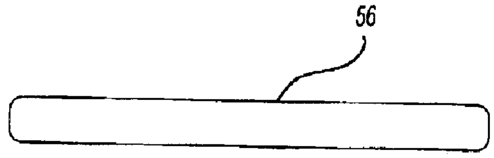
Figure 8N:
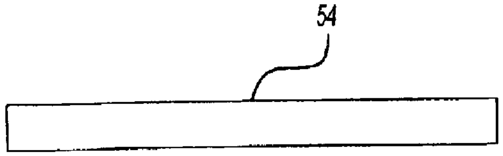
Figure 8O:

Turning more specifically to the structures illustrated in FIGS. 8A–8O, 9A–9X, 10A–10R, and 11A–11R, the structure of the first portion for attaching to a structure may be rectangular, (e.g. as shown in FIGS. 8K and 8N), and have a squared off end 54, a rounded end 56 (e.g., FIG. 8M), a tapered end 58 (e.g., FIG. 8O), an intermediate channel 60 such as for a snap fit, a zipper fit, or the like (e.g., FIG. 8L) or combinations thereof. It may include (as a hook portion) one or more barbs 62 (e.g., to resemble an arrowhead (e.g., FIGS. 8A–8C and 8I)) as in FIGS. 8A–8J. Along with the barb, there may be a notch 64 (e.g., FIG. 8J), a projection 66 (e.g., FIGS. 8F, 8G, 8H), or a combination thereof.

Figure 9A:
FIGS. 9A–9X are front views illustrating a variety of different profiles useful in accordance with the present invention.
Figure 9B:
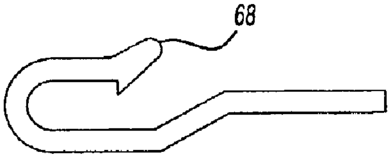
Figure 9C:
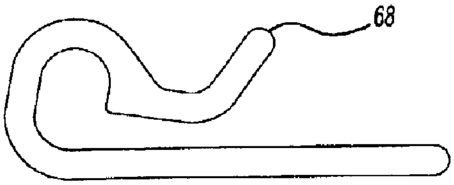
Figure 9D:
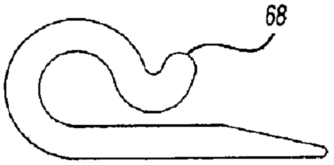
Figure 9E:
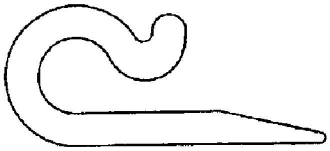
Figure 9F:
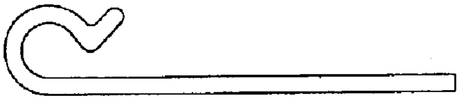
Figure 9G:
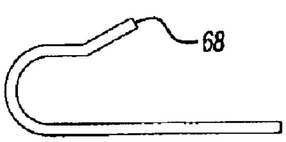
Figure 9H:
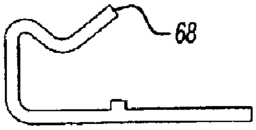
Figure 9I:
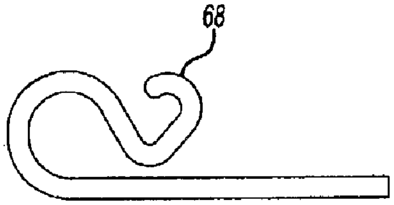
Figure 9J:
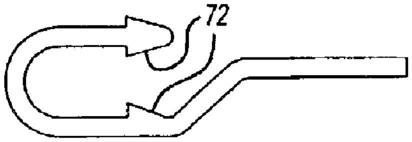
Figure 9K:
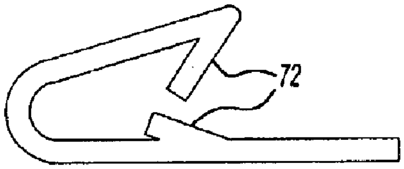
Figure 9L:
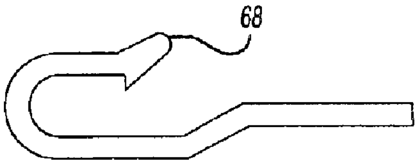
Figure 9M:
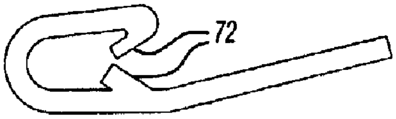
Figure 9N:
Figure 9O:
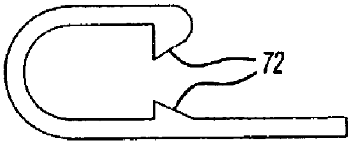
Figure 9P:
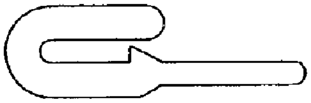
Figure 9Q:
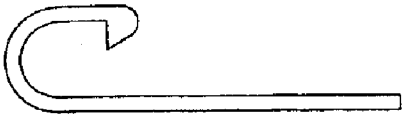
Figure 9R:
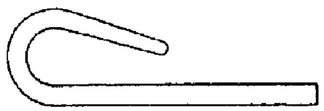
Figure 9S:
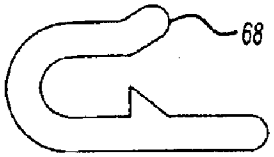
Figure 9T:
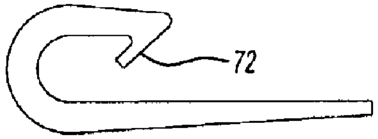
Figure 9U:
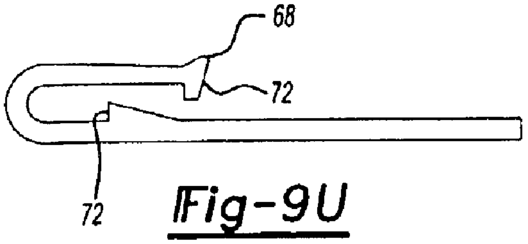
Figure 9V:
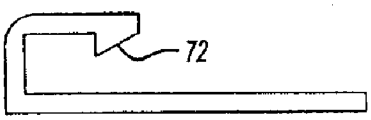
Figure 9W:
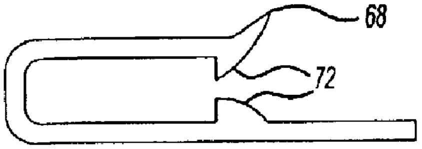
Figure 9X:
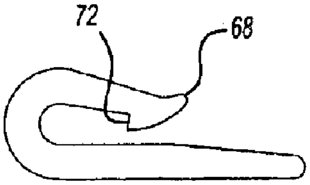
Figure 10A:
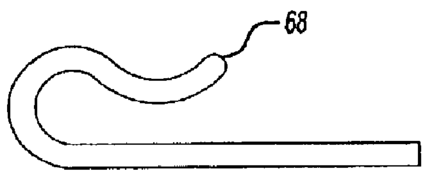
FIGS. 10A–10R are front views illustrating a variety of different profiles useful in accordance with the present invention.
Figure 10B:
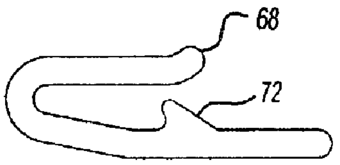
Figure 10C:
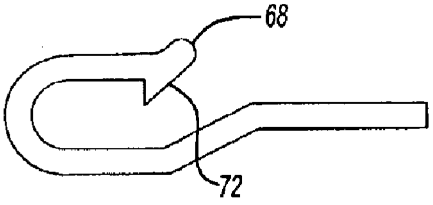
Figure 10D:
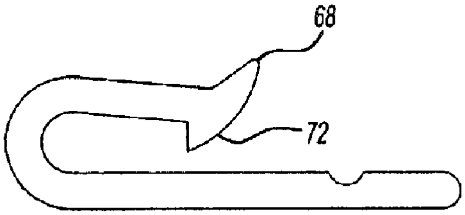
Figure 10E:
Figure 10F:
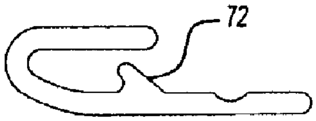
Figure 10G:
Figure 10H:
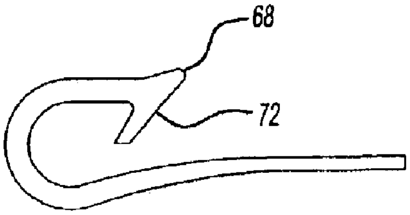
Figure 10I:
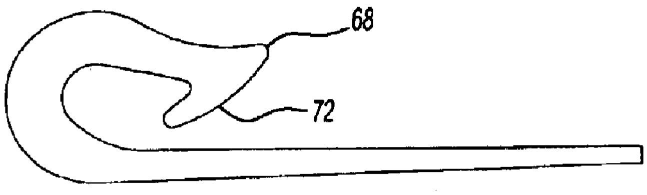
Figure 10J:
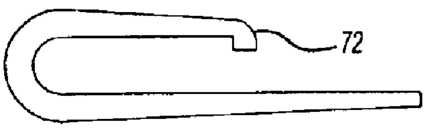
Figure 10K:
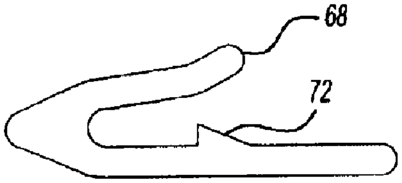
Figure 10L:
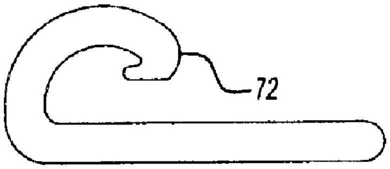
Figure 10M:
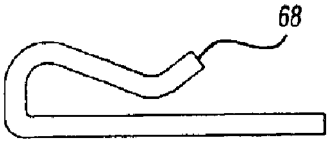
Figure 10N:
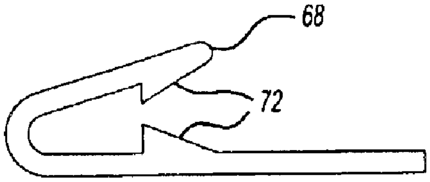
Figure 10O:
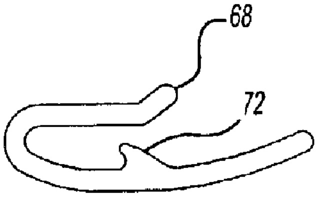
Figure 10P:
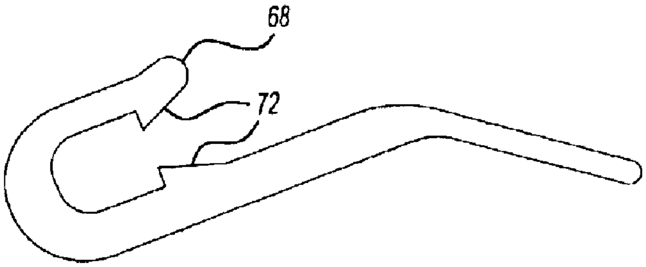
Figure 10Q:
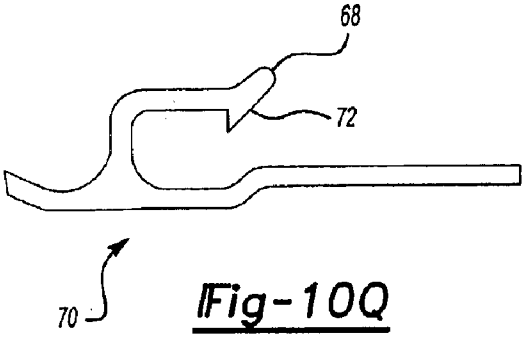
Figure 10R:
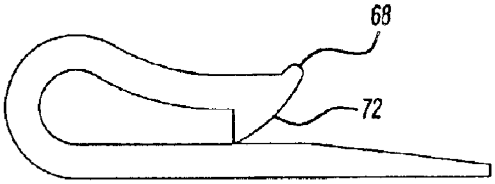
Figure 11A:
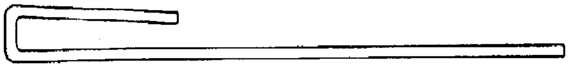
FIGS. 11A–11R are front views illustrating a variety of different profiles useful in accordance with the present invention.
Figure 11B:
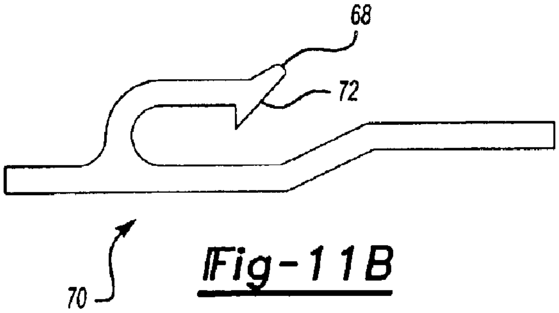
Figure 11C:
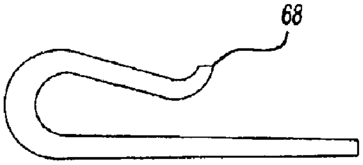
Figure 11D:
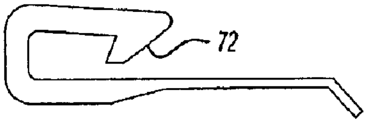
Figure 11E:
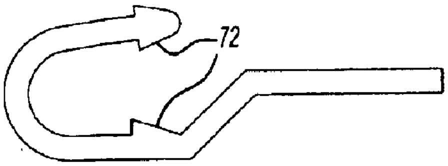
Figure 11F:
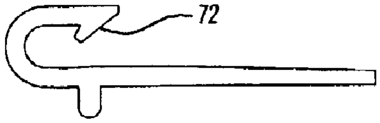
Figure 11G:
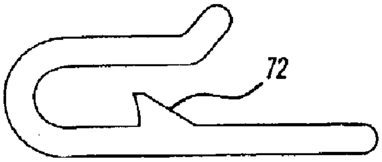
Figure 11H:
Figure 11I:
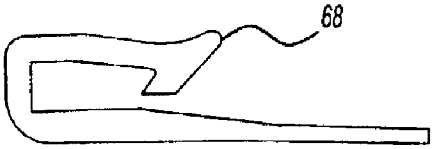
Figure 11J:
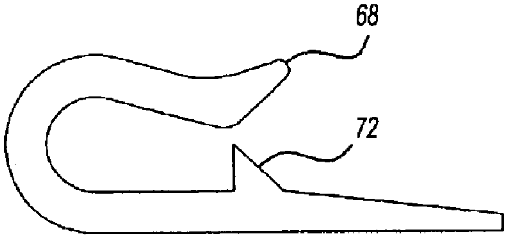
Figure 11K:
Figure 11L:
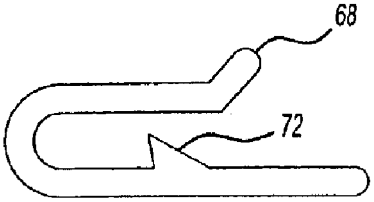
Figure 11M:
Figure 11N:
Figure 11O:
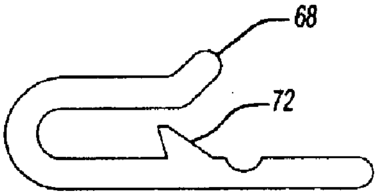
Figure 11P:
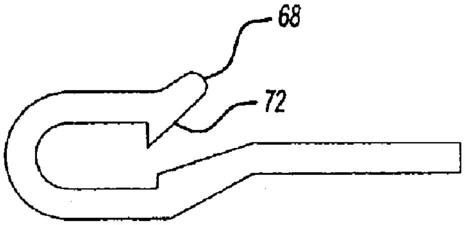
Figure 11Q:
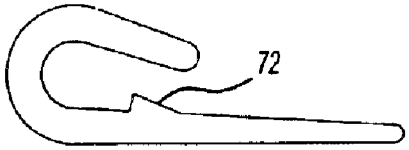
Figure 11R:

Hooks may employ any suitable configuration as well. They may depend from a straight web portion, a curved web portion or a combination thereof. FIGS. 9A–9X, 10A–10R, and 11A–11R illustrate a variety of these web portions. As seen, the web portion may be of constant or varying section thickness. The hooks can have an outwardly projecting tip 68. The hook can project away from the web at an intermediate location 70 (e.g., FIGS. 10Q and 11B). The hook can fold upon itself in substantially contacting relation with a web portion or a projection from the web portion (e.g., FIGS. 9A, 9C, 9D, 9I, 9M, 9P, 9W, 9X, 10E, 10F, 10G, 10M, 10O, 10R, 11D, 11I, 11O, 11R). The hook portion need not necessarily be arcuate but can be squared off as seen, for example (without limitation) in FIGS. 9H, 9V, 10Q, 11A, 11D, and 11I. The hook portion can have one or more projections (e.g., grippers) 72 as throughout FIGS. 9A–11R. They may be in pairs that are directly opposing each other (e.g., FIG. 9W), or that are offset from each other, as in FIG. 9U, by way of illustration. Other variations are also seen upon review of FIGS. 8A–8O, 9A–9X, 10A–10R, and 11A–11Q. It will be appreciated that the above are not intended as limiting and other structures are also possible, including combinations of two or more of the above structures.

Figure 12:
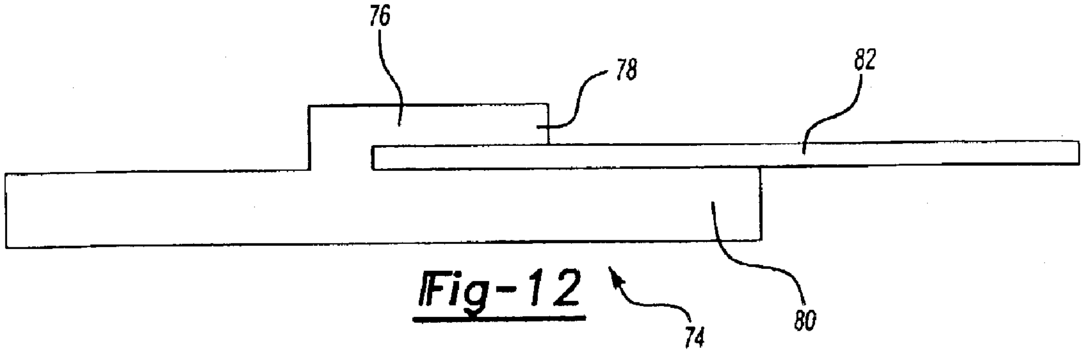
FIG. 12 is a front view of an alternative profile attached to a substrate.

FIG. 12 illustrates yet another profile 74, in accordance with the present invention. The profile 74 includes an arm 76 that has a tip 78 displaceable relative to a base 80. The arm is located at an intermediate location between ends of the base. A substrate 82 (e.g., upholstery material) can be placed between the arm 76 and the base 80, and secured in place in accordance with the teachings herein.

In a preferred embodiment, the plastic material is a thermoplastic material, though it is possible that a thermoset material may be suitably employed. Examples of preferred thermoplastics include, without limitation, polyamides, polyolefins, polyesters, polycarbonates, polystyrenes, polyvinylchlorides, fluoropolymers, thermoplastic elastomers, or the like and mixtures of two or more of the listed thermoplastics. A highly preferred thermoplastic family includes polyolefins, with specific preferred materials, including polyethylene, polypropylene, or a mixture thereof. The polyolefin may be a low density, medium density, or a high density polyolefin.

Thermoplastics for use herein may be filled or unfilled, reinforced, or unreinforced, and may contain other art-disclosed additives such as UV stabilizers or the like. The surfaces may be treated as desired as well, such as with a suitable coating or additional protective layer. Preferably the thermoplastic is unfoamed, but foamed materials may be used as well.

A preferred thermoplastic for use here will have a melt flow index (at about 230° C.) of at least about 0.2 g/min, more preferably at least about 1 g/10 min, and more preferably at least about 3 g/10 min, and more preferably from about 5 g/10 min to about 20 g/10 min. Resulting material will exhibit a tensile strength (at yield) of at least about 25 Mpa and more preferably about 30 to about 50 Mpa, and a flexural modulus of at least about 600 Mpa and more preferably at least about 1000 Mpa. One preferred material will also exhibit an elongation at yield of at least about 10%, and possibly as high as at least 25%.

Examples of commercially available materials include those sold under the trade designation PP3920 from Plastic Services of Michigan, Inc., Polyfort® FPP1151E or PP1349E, from A. Schulman Inc. Preferred properties of the materials of the present invention will approximate the properties of those materials, preferably within a range of about +/−50%.

Figure 1A:
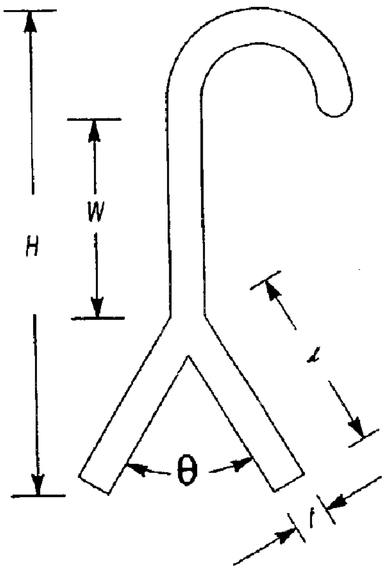
FIG. 1A is a magnified front view of the profile of FIG. 1.

As better shown in the magnified section of FIG. 1A, the legs will be of any suitable length (l) ranging as low as about 1 mm. Typically the legs will be about 3 to about 20 mm, and more preferably from about 5 to about 15 mm. The thickness (t) of the legs may range from about 0.1 to about 3 mm. More typically, it will be about 0.5 to about 2 mm. The legs of one preferred embodiment, shown in FIGS. 1 and 3 preferably meet at an apex to form an angle (θ) between them and define the channel 32 (32'). The angle (θ) may be large, but a preferred approach is that it be less than about 90°, it also being recognized that during processing further spreading is also possible. Though smaller or larger dimensions are possible, the overall height (H) of the profiles preferably will range from about 0.75 cm to about 20 cm, and more preferably about 1.5 cm to about 5 cm.

Though other manufacturing techniques are possible, the attachment devices of the present invention are made by a process that includes the steps of:

a) extruding a profile from a plastic material that has at least two separable legs that define a channel for receiving a substrate;

b) cooling the profile;

c) placing the substrate in the channel;

d) injecting a liquid material into the channel with the substrate; and optionally applying pressure to the legs as the liquid material hardens and bonds to both the substrate and the profile.

After extruding using art-disclosed extruding techniques, the profile is cooled in any suitable manner, and desirably in a manner that substantially minimizes or avoids distortion as a result of different cooling rates from the different thicknesses along and within the profile. When it is anticipated that distortion is to occur, then the step of placing the substrate in the channel can be delayed until after the cooling. Although, it is possible to initiate the step during cooling, provided the liquid material and pressure applying steps are not both completed until any expected distortion has occurred.

The substrate (e.g., upholstery material 28(28')) is inserted into the channel 32(32') in any suitable manner. Preferably, after exiting the extruder, the profile is brought together with the substrate. During this step, it is also desirous to introduce a relatively small continuous or intermittent bead of liquid into the channel for bonding the substrate to the profile. Though certain adhesives may be employed, a highly preferred liquid will be a molten plastic material compatible for bonding between the substrate and the profile upon solidification. For example, a molten polymer of identical or substantially similar composition as the profile, the substrate, or more preferably both, is introduced into the channel. For example, the molten polymer may be injected through a suitable dispensing orifice into the channel, before, during or after placement of the substrate into the channel. Alternatively, or in addition thereto, the molten polymer may be applied to the substrate (e.g., along an edge) and while still in a molten state or when solidified (but subject to further heating for additional melting), it is placed in the channel. The liquid may have any suitable processing viscosity during introduction to the channel. However, it is preferred that its viscosity ultimately becomes relatively high so that, in normal operating conditions for the end product, the material will not run.

The amount of the molten polymer that is employed may be any suitable amount, but preferably it is an amount that is sufficiently high for achieving a high integrity bond with both the substrate and the profile, but not so much that upon solidification internal stresses would arise that are enough to cause visible distortion of the profile. While this ordinarily may require some trial and error for arriving at an optimum amount, it is useful to calculate the amount of the molten polymer to be less than the total volume that would be occupied by the legs of the profile, and more preferably less than about 70% of such total volume, and still more preferably less than about 50% of such total volume.

As described in the above, one preferred approach is to melt a polymer before introducing it into the channel. Another approach contemplates melting a polymer after it has been introduced into the channel, such as by a localized heating or melting step (e.g., the use of a light or heat energy source such as a laser, radiation, resistance heating or otherwise). It may also be possible to coextrude a thermally conductive wire in the profile for introducing local heating. In another embodiment, a vibration weld is employed for locally heating and fusing the substrate and the profile. In another embodiment, the liquid is introduced into the channel by providing a plurality of polymer fibers can soften and melt before the larger cross sectioned profile.

Figure 13A:
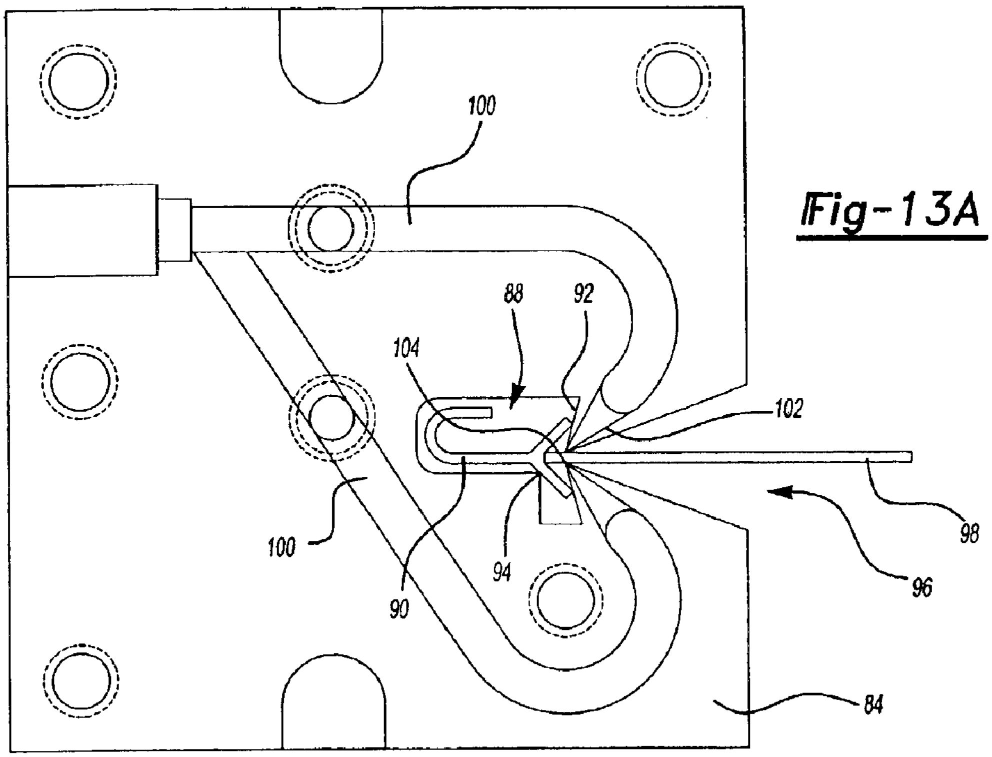
FIGS. 13A–13B are views of tooling for use in accordance with the present invention.
Figure 13B:
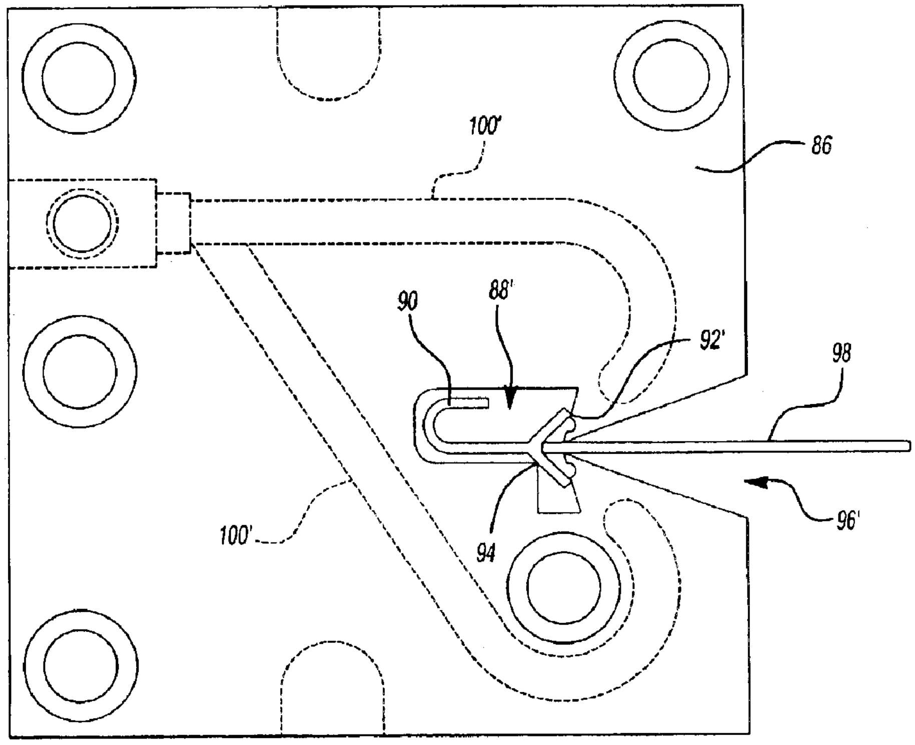

FIGS. 13A and 13B illustrate an example of suitable tooling that can be employed for introducing a liquid between the legs of a profile. Preferably the tooling includes a portion for maintaining legs of the profile in a spread position, a portion for receiving a substrate, such as the upholstery material, and a portion for directing the liquid into the channel between the legs. This can be accomplished, for example, by providing tooling including a first die 84 and a second die 86, which are both placed in opposing relation to the other during processing. At least one of the dies has a receiving portion 88 (88') adapted for receiving a profile 90, and including a wall structure 92 (92') against which the legs 94 of the profile 90 can abut during processing. An inlet 96 (96') is defined in at least one of the dies through which a substrate 98 can be directed between the legs 94. One or both of the dies may have a suitable fluid communication line (e.g., a runner 100 (100')) that preferably culminates in a funnel shaped wall 102 for defining a dispensing orifice 104, through which the liquid can be dispensed between the legs of the profile.

After the liquid is dispensed, pressure is optionally applied for directing the legs of the profile toward each other, with the liquid and the substrate therebetween. Any suitable approach may be employed, such as by placing the assembled components between opposing dies, opposing rollers or the like.

Thereafter, upon the application of a suitable pressure, cooling or both, there will result in a product that avoids the need for a stitch for mechanically securing the substrate and the profile together, while being substantially free of thermal distortion.

It will be appreciated that, as an alternative to or in addition to the above techniques, it is also possible to secure the substrate to the profile using a suitable adhesive (with or without a suitable primer), and optionally one or more mechanical attachments (such as a stitch, fastener, heat stake, or the like).

The present invention finds utility in any of a number of different applications, but it especially preferred for the attachment of a J-hook profile (e.g., one made of polypropylene) to a suitable automotive upholstery fabric, such as a woven or unwoven plastic fiber material (e.g., a woven or unwoven polypropylene fabric, such as that having similar characteristics as that sold by BP Amoco under the designation DUON®). Thus, it is contemplated in one method of the present invention that a covering for a seat (particularly an automotive vehicle seat) is made by securing a fabric to a profile using the steps described herein. It is assembled onto a seat using art-disclosed techniques, by placing it over a cushion material and then securing it along its edges using the J-hook for grabbing onto an underlying structure, such as a seat frame. In this regard, other materials such as leather or synthetic leather may be employed in addition to or instead of the fabric. Other substrates that can be secured to a profile according to the present invention include carpeting, drapery, article covers, luggage, storage containers, or the like. The methods of the present invention thus contemplate the formation (e.g., by extrusion) of a suitable profile, and its attachment to a suitable substrate for forming the desired article.

The present invention is also advantageous in that in a highly preferred embodiment, the material of the profile, the fabric and the liquid introduced to join them will be substantially the same. This will permit the resulting assembly, upon conclusion of its useful life to be recycled as a unit. Thus, the present invention also contemplates a method in which an article prepared according to the methods disclosed herein is recycled as a unit.

Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. Materials specified for use herein may be virgin materials, recycled materials or a combination thereof. They may also be used alone or in combination with other materials, such as in blends, composites, copolymers, or the like.

It is contemplated that the profile is substantially uniform and continuous along the length of the parts extruded in accordance with the present inventions. Thus, the views identified as front views of the embodiments herein will also be their respective sectional views. It is possible, however, that certain preferred embodiments need not have the same profile entirely along its length. Rather, a profile illustrated herein may be intermittently located along the length of a part. Alternatively, a profile may change from one of the illustrated profiles to another different profile along the part length. A profile may have a thinner or thicker section (e.g., as a result of a stretching operation or the like during processing). Other variations are also possible within the scope of the present invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention.

What is claimed is:

1. A method for attaching a substrate to a plastic profile, comprising the steps of:

a. extruding a profile from a plastic material that has at least two separable legs that define a channel for receiving a substrate;

b. placing the substrate in the channel;

c. injecting a liquid material into the channel with the substrate for joining the substrate with the profile; and d. employing a die for maintaining the separable legs apart from each other during said step c.

2. The method of claim 1, further comprising employing a die adapted for maintaining the legs spread from each other, and having an inlet for receiving the substrate, and a runner for fluidly communicating a liquid to the channel.

3. The method of claim 1, wherein the profile is extruded to include a J-hook configuration.

4. The method of claim 1, wherein the liquid is a molten plastic.

5. The method of claim 4, wherein the molten plastic is substantially the same material as the plastic of the profile.

6. The method of claim 5, wherein the substrate is substantially the same material as the molten plastic and the material of the profile.

7. The method of claim 6, wherein the materials of the molten plastic, profile and substrate are polypropylene.

8. The method of claim 1, wherein the substrate is a plastic fabric.

9. The method as recited in claim 1, wherein the die includes an inlet for receiving the substrate, and a runner for communicating a liquid to the channel.

10. A method for attaching an upholstery material to an extruded plastic profile, comprising the steps of:

a. extruding a profile, including a hook portion, from a thermoplastic material, which profile has at least two separable legs that define a channel for receiving a substrate;

b. cooling the profile;

c. placing the upholstery material in the channel; and d. injecting a molten plastic material into the channel with the upholstery material for joining the upholstery material with the profile; and e. employing a die for maintaining the separable legs apart from each other during said step d.

11. The method of claim 10, further comprising employing a die adapted for maintaining the legs spread from each other, and having an inlet for receiving the upholstery material, and a runner for fluidly communicating a molten plastic to the channel.

12. The method of claim 10, wherein the profile is extruded to include a J-hook configuration.

13. The method of claim 12, wherein the tip of the J-hook is substantially juxtaposed with the legs.

14. The method of claim 10, wherein the materials of the molten plastic, profile and upholstery material are polypropylene.

15. The method of claim 10, wherein the profile is extruded to include a barb.

16. The method of claim 10, wherein the profile has an end portion that is generally rectangular.

17. The method of claim 10, wherein the profile includes a hook that projects from an intermediate location along the profile.

18. The method as recited in claim 10, wherein the die includes an inlet for receiving the substrate, and a runner for communicating a liquid to the channel.

19. A method for attaching a substrate to a plastic profile, comprising the steps of:

a. extruding a polypropylene profile that has a J-hook portion terminating at a tip and at least two separable legs that join at an apex and define a channel for receiving a polypropylene fabric;

b. cooling the profile;

c. placing the legs of the profile in a die adapted for maintaining the legs spread from each other;

d. inserting a polypropylene fabric in the channel via an inlet in the die; and e. injecting molten polypropylene through a runner in the die and into the channel for joining the fabric with the profile, wherein the fabric and the profile are joined in the absence of stitching.

20. The method of claim 19, wherein the tip is substantially juxtaposed with the legs at a location proximate the apex.

21. The method of claim 19, further comprising applying pressure to the legs as the injected molten polypropylene hardens.

22. The method of claim 19, further comprising assembling the profile with the fabric attached thereto to an automotive vehicle seat frame.

* * * * *